United States Patent
Ookubo

(10) Patent No.: US 8,123,388 B2
(45) Date of Patent: Feb. 28, 2012

(54) VEHICLE HEADLAMP

(75) Inventor: Yasuhiro Ookubo, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 246 days.

(21) Appl. No.: 12/641,003

(22) Filed: Dec. 17, 2009

(65) Prior Publication Data

US 2010/0165652 A1 Jul. 1, 2010

(30) Foreign Application Priority Data

Dec. 25, 2008 (JP) ................................. 2008-329515

(51) Int. Cl.
*F21V 17/02* (2006.01)
(52) U.S. Cl. ........ 362/512; 362/513; 362/518; 362/538; 362/545
(58) Field of Classification Search .................. 362/509, 362/235, 240, 244, 246, 249.02, 311.02, 362/332, 800, 370, 371, 372, 368, 518–545
See application file for complete search history.

(56) References Cited

U.S. PATENT DOCUMENTS

2007/0291499 A1 12/2007 Tanaka

FOREIGN PATENT DOCUMENTS

| | | |
|---|---|---|
| EP | 0 623 780 B1 | 11/1994 |
| EP | 1 916 470 A2 | 4/2008 |
| JP | 2007-184239 A | 7/2007 |
| JP | 4182126 B2 | 9/2008 |

*Primary Examiner* — Anabel Ton
*Assistant Examiner* — Danielle Allen
(74) *Attorney, Agent, or Firm* — Foley & Lardner LLP

(57) ABSTRACT

A vehicle headlamp has semiconductor-type light sources and lenses. Emission surfaces of the lenses are made of free curved faces controlled to be curved so that: projection images of light emitting chips of the semiconductor-type light sources, which is emitted from the emission surfaces, are not convexly curved in an upward direction from cutoff lines on a screen light distribution of a light distribution pattern for low beam. As a result, the vehicle headlamp can achieve downsizing, weight reduction, and cost reduction. In addition, the precision of assembling an optical element can be improved.

10 Claims, 15 Drawing Sheets

VEHICLE HEADLAMP

CROSS-REFERENCE TO RELATED APPLICATIONS

This application claims priority of Japanese Patent Application No. 2008-329515 filed on Dec. 25, 2008. The contents of this application are incorporated herein by reference in their entirety.

BACKGROUND OF THE INVENTION

1. Field of the Invention

The present invention relates to a vehicle headlamp for illuminating a light distribution pattern having cutoff lines, for example, a light distribution pattern for low beam (light distribution pattern for passing) toward a forward direction of a vehicle.

2. Description of the Related Art

A vehicle headlamp of this type is conventionally known (Japanese Laid-open Patent No. 4182126, for example). Hereinafter, the conventional vehicle headlamp will be described. The conventional vehicle headlamp is provided with: an LED light source; a projecting lens; and a shading member. Hereinafter, functions of the conventional vehicle headlamp will be described. When the LED light source is lit, a part of the light from the LED light source is cut off by means of the shading member, the remaining light that has not been cut off by means of the shading member is passed through the projecting lens, and is illuminated (projected) to the forward direction of the vehicle, as a light distribution pattern having cutoff lines.

However, the conventional vehicle headlamp is provided with the LED light source, the projecting lens, and the shading member, thus requiring a large number of components and entailing a problem concerning downsizing, weight reduction, and cost reduction accordingly. Moreover, in the conventional vehicle headlamp, a relationship between the numbers of the constituent LED light sources and optical elements becomes one LED light source and two optical elements, the projecting lens and the shading member (1:2). Therefore, in the conventional vehicle headlamp, an error concerning a combination of dispersions in the projecting lens and shading member as two constituent optical elements is prone to occur, and there is a problem associated with precision of assembling the projecting lens and the shading member as the two constituent optical elements.

In addition, a vehicle lighting device having a light emitting diode and a lens is known (Japanese Laid-open Patent Application No. 2007-184239, for example). However, the aforementioned vehicle lighting device is a cornering lamp, and illuminates a horizontally elongate light distribution pattern toward a road face of a left-oblique forward direction or a right-oblique forward direction of a vehicle. In other words, the aforementioned vehicle lighting device is intended to illuminate the horizontally elongate light distribution pattern, and is not intended to illuminate a light distribution pattern having cutoff lines, for example, a light distribution pattern for low beam (light distribution pattern for passing) toward the forward direction of the vehicle.

The present invention has been made to solve the aforementioned problems that still remain unsolved in the conventional vehicle headlamp, one of which concerns downsizing, weight reduction, or cost reduction and the other one of which is associated with precision of assembling the two constituent optical elements, i.e., the projecting lens and the shading member.

SUMMARY OF THE INVENTION

A first aspect of the present invention is directed to a vehicle headlamp, comprising:
(i) a semiconductor-type light source having a light emitting chip shaped like a planar rectangle; and
(ii) a lens adapted to illuminate light from the light emitting chip of the semiconductor-type light source toward a forward direction of a vehicle, as a light distribution pattern having cutoff lines, wherein:
a center of the light emitting chip is positioned at or near a reference focal point of the lens and is positioned on or near a reference axis of the lens;
a light emitting face of the light emitting chip is oriented toward a forward direction of the reference axis of the lens;
a long side of the light emitting chip is parallel to a horizontal axis orthogonal to the reference axis of the lens or is inclined with respect to the horizontal axis;
an incidence surface of the lens is made of a conical curved face;
an emission surface of the lens is made of a free curved face controlled to be curved so that a protection image of the light emitting chip, which is emitted from the emission surface of the lens face, is not convexly curved in an upward direction from the cutoff line on a screen light distribution of the light distribution pattern and so that a part of the projection image of the light emitting chip is substantially in contact with the cutoff line; and
the free curved face of the emission surface of the lens includes a first quadrant, a second quadrant, a third quadrant, and a fourth quadrant which are divided by a vertical axis and a horizontal axis orthogonal to each other and passing through an origin, with a reference axis of lens serving as the origin in a front view, and is made of a free curved face on which: in a case where the first quadrant and the second quadrant are compared with each other in a symmetrical position relationship with respect to the vertical axis, a portion of about ⅓ or more of the first quadrant is higher than the second quadrant in a forward direction of the reference axis of the lens; and in a case where the first quadrant and the fourth quadrant are compared with each other in a symmetrical position relationship with respect to the horizontal axis, the portion of about ⅓ or more of the first quadrant is lower than the fourth quadrant in the forward direction of the reference axis of the lens.

A second aspect of the present invention is directed to the vehicle headlamp according to the first aspect, wherein:
the semiconductor-type light source and the lens comprise:
a semiconductor-type light source and a lens for spot light distribution, which has a function of a spot light distribution at a substantial central portion on a screen light distribution of the light distribution pattern; and
a semiconductor-type light source and a lens for diffused light distribution, which serve to implement a diffused light distribution of an entire portion on the screen light distribution of the light distribution pattern.

A third aspect of the present invention is directed to the vehicle headlamp according to the second aspect, wherein:
the cutoff line of the light distribution pattern is made of:
an oblique cutoff line of an upward gradient from an elbow point to a cruising lane side;
an upper horizontal cutoff line which is horizontal from the oblique cutoff line to the cruising lane side; and a lower horizontal cutoff line which is horizontal from the elbow point to an opposite lane side, a long side of the light emitting chip of the semiconductor-type light source for spot light distribution is tilted with respect to the horizontal axis by rotating the long side by about 5 degrees so that the cruising lane side becomes upper than the opposite lane side with respect to the horizontal axis around the reference axis of the lens;

a long side of the light emitting chip of the semiconductor-type light source for diffused light distribution is parallel to the horizontal axis;

a projection image of the light emitting chip, which is emitted from the first quadrant and the fourth quadrant of an emission surface of a respective one of the lens for spot light distribution and the lens for diffused light distribution, mainly forms a light distribution on the cruising lane side from the elbow point on the screen light distribution of the light distribution pattern; and a projection image of the light emitting chip, which is emitted from the second quadrant and the third quadrant of an emission surface of a respective one of the lens for spot light distribution and the lens for diffused light distribution, mainly forms a light distribution on the opposite lane side from the elbow point on the screen light distribution of the light distribution pattern.

A fourth aspect of the present invention is directed to a vehicle headlamp, comprising:

(i) a light source; and (ii) a lens including an emission surface made of a free curved face, adapted to illuminate light from the light source toward a forward direction of a vehicle, as a light distribution pattern having cutoff lines, wherein:

a center of the light source is position at or near a reference focal point of the lens and is position on or near a reference axis of the lens;

a light emitting face of the light source is oriented in a forward direction of the reference axis of the lens;

a long side of the light source is parallel to a horizontal axis orthogonal to the reference axis of the lens or is inclined relative to the horizontal axis;

a free curved face of an emission surface of the lens includes a first quadrant, a second quadrant, a third quadrant, and a fourth quadrant which are divided by a vertical axis and a horizontal axis orthogonal to each other and passing through an origin, with the reference axis of the lens serving as the origin of the lens in a front view;

the first quadrant has a predetermined height relationship in a forward direction of the reference axis of the lens with respect to the second quadrant in the vertical axis and the fourth quadrant in the horizontal axis, respectively, and:

the emission surface of the lens is thereby controlled to be curved so that: a projection image of the light emitting chip, which is emitted from the emission surface of the lens, is not convexly curved in a forward direction from the cutoff line on a screen light distribution of the light distribution pattern; and a part of the projection image of the light emitting chip is substantially in contact with the cutoff line A fifth aspect of the present invention is directed to the vehicle headlamp according to the fourth aspect, wherein:

the free curved face of the emission surface of the lens is constituted so that:

in a case where the first quadrant and the second quadrant are compared with each other in a symmetrical position relationship with respect to the vertical axis, a portion of about ⅓ or more of the first quadrant is higher than the second quadrant in a forward direction of the reference axis of the lens; and in a case where the first quadrant and the fourth quadrant are compared with each other in a symmetrical position relationship with respect to the horizontal axis, a portion of about ⅓ or more of the first quadrant is lower than the fourth quadrant in a forward direction of the reference axis of the lens.

A sixth aspect of the present invention is directed to the vehicle headlamp according to the fourth aspect, wherein:

the light source and the lens comprises:

a semiconductor-type light source and a lens for spot light distribution, which serve to implement a spot light distribution at a substantial central portion on a screen light distribution of the light distribution pattern; and a semiconductor-type light source and a lens for diffused light distribution, which serve to implement a diffused light distribution of an entire portion on the screen light distribution of the light distribution pattern.

A seventh aspect of the present invention is directed to the vehicle headlamp according to the fourth aspect, wherein:

the light source and the lens comprises:

a semiconductor-type light source and a lens for spot light distribution, which serve to implement a spot light distribution at a substantial central portion on a screen light distribution of the light distribution pattern; and a semiconductor-type light source and a lens for diffused light distribution, which serve to implement a diffused light distribution of an entire portion on the screen light distribution of the light distribution pattern, a long side of the light emitting chip of the semiconductor-type light source for spot light distribution is inclined with respect to the horizontal axis by rotating the long side by about 5 degrees so that the cruising lane side becomes upper than the opposite lane side with respect to the horizontal axis around the reference axis of the lens;

a long side of the light emitting chip of the semiconductor-type light source for diffused light distribution is parallel to the horizontal axis;

the lens for spot light distribution forms a spot light distribution by combining respective light distribution patterns, which are emitted from the first quadrant, the second quadrant, the third quadrant, and the fourth quadrant, with each other on the emission surface of the lens for diffused light distribution; and the lens for diffused light distribution forms a diffused light distribution by combining respective light distribution patterns, which are emitted from the first quadrant, the second quadrant, the third quadrant, and the fourth quadrant, with each other on an emission surface of the lens for diffused light distribution, and forms a light distribution pattern for low beam, to be illuminated toward the forward direction of the vehicle by combining the spot light distribution formed by means of the lens for spot light distribution and the diffused light distribution formed by means of the lens for diffused light distribution with each other.

An eighth aspect of the present invention is directed to the vehicle headlamp according to the fourth aspect, wherein:

the semiconductor-type light source and the lens comprise:

a light source and a lens for spot light distribution, which serve to implement a spot light distribution at a substantially central portion on a screen light distribution of the light distribution pattern; and a light source and a lens for diffused light distribution, which serve to implement a diffused light distribution of an entire portion on the screen light distribution of the light distribution pattern, the cutoff line of the light distribution pattern is made of:

an oblique cutoff line of an upward gradient from an elbow point to a cruising lane side;

an upper horizontal cutoff line from the oblique cutoff line to the cruising lane side; and a lower horizontal cutoff line which is horizontal from the oblique cutoff line to an opposite lane side, a long side of the light source for spot light distribution is inclined with respect to the horizontal axis by rotating the long side by about 5 degrees so that the cruising lane side is upper than the opposite lane side with respect to the horizontal axis around the reference axis of the lens;

a long side of the light source for diffused light distribution is parallel to the horizontal axis;

a projection image of the light emitting chip, which is emitted from the first quadrant and the fourth quadrant of an emission surface of the lenses for spot light distribution and for diffused light distribution, mainly forms a light distribution on the cruising lane side from the elbow point on the screen light distribution of the light distribution pattern; and a projection image of the light emitting chip, which is emitted from the second quadrant and the third quadrant of an emission surface of the lenses for spot light distribution and for diffused light distribution, mainly forms a light distribution on the opposite lane side from the elbow point on the screen light distribution of the light distribution pattern.

A ninth aspect of the present invention is directed to a vehicle headlamp, comprising:

(i) a semiconductor-type light source having a light emitting chip shaped like a planar rectangle; and (ii) a lens adapted to illuminate light from the light emitting chip of the semiconductor-type light source toward a forward direction of a vehicle, as a light distribution pattern having cutoff lines, wherein:

the semiconductor-type light source and the lens include:

a light source and a lens for spot light distribution, which serve to implement a spot light distribution at a substantially central portion on a screen light distribution of the light distribution pattern, a respective one of which has the light emitting chip; and a light source and a lens for diffused light distribution, which serve to implement a diffused light distribution of an entire portion on the screen light distribution of the light distribution pattern, a respective one of which has the light emitting chip, a center of a respective one of the light emitting chips is oriented in a forward direction of the reference axis of a respective one of the lenses;

a long side of the respective one of the light emitting chips is parallel to a horizontal axis orthogonal to the reference axis of the respective one of the lenses or is inclined with respect to the horizontal axis;

an incidence surface of the respective one of the lenses is made of a conical curved face;

an emission surface of a respective one of the lenses for spot light distribution and diffused light distribution is made of a free curved face controlled to be curved so that: a projection image of the respective one of the light emitting chips, which is emitted from the respective one of the lenses, is not convexly curved in an upward direction from the cutoff line on the screen light distribution of the light distribution pattern; and so that a part of the projection image of the respective one of the light emitting chips is substantially in contact with the cutoff line; and the free curved face of the emission surface of the lens includes a first quadrant, a second quadrant, a third quadrant, and a fourth quadrant which are divided by a vertical axis and a horizontal axis orthogonal to each other and passing through an origin, with a reference axis of lens serving as the origin in a front view, and is made of a free curved face on which: in a case where the first quadrant and the second quadrant are compared with each other in a symmetrical position relationship with respect to the vertical axis, a portion of about ⅓ or more of the first quadrant is higher than the second quadrant in a forward direction of the reference axis of the lens; and in a case where the first quadrant and the fourth quadrant are compared with each other in a symmetrical position relationship with respect to the horizontal axis, the portion of about ⅓ or more of the first quadrant is lower than the fourth quadrant in the forward direction of the reference axis of the lens.

A tenth aspect of the present invention is directed to the vehicle headlamp according to the ninth aspect, wherein:

the cutoff line of the light distribution pattern is made of:

an oblique cutoff line of an upward gradient from an elbow point to a cruising lane side;

an upper horizontal cutoff line from the oblique cutoff line to the cruising lane side; and a lower horizontal cutoff line which is horizontal from the oblique cutoff line to an opposite lane side, a long side of the light source for spot light distribution is inclined with respect to the horizontal axis by rotating the long side by about 5 degrees so that the cruising lane side is upper than the opposite lane side with respect to the horizontal axis around the reference axis of the lens;

a long side of the light source for diffused light distribution is parallel to the horizontal axis;

a projection image of the light emitting chip, which is emitted from the first quadrant and the fourth quadrant of an emission surface of the lenses for spot light distribution and for diffused light distribution, mainly forms a light distribution on the cruising lane side from the elbow point on the screen light distribution of the light distribution pattern; and a projection image of the light emitting chip, which is emitted from the second quadrant and the third quadrant of an emission surface of the lenses for spot light distribution and for diffused light distribution, mainly forms a light distribution on the opposite lane side from the elbow point on the screen light distribution of the light distribution pattern.

The vehicle headlamp of the first aspect of the present invention is characterized in that, if the light emitting chips of the semiconductor-type light sources are lit to emit light by means for solving the above-described problem, when the light radiated from the light emitting chips is incident from the incidence surfaces of the lenses and is emitted from the emission surfaces, the projection images of the light emitting chips that are substantially in contact with the cutoff lines are emitted so as not to convex in an upward direction from the cutoff lines on the screen light distribution of the light distribution pattern for low beam, so that the light distribution pattern for low beam, having the cutoff lines, can be obtained by means of the semiconductor-type light sources and the lenses.

Moreover, the vehicle headlamp of the first aspect of the present invention is made of the semiconductor-type light source and the lenses, so that: the number of components is reduced in comparison with the conventional vehicle headlamp; and downsizing, weight reduction, and cost reduction can be achieved accordingly. Moreover, the vehicle headlamp of the embodiment allows a relationship between the numbers of constituent light sources and optical elements to be obtained as one set of constituent semiconductor-type light sources and one set of constituent elements made of lenses (1:1). As a result, the vehicle headlamp of the first aspect of the present invention become capable of eliminating an error of combination in dispersions at the optical element side and improving the precision of assembling of the lenses at the optical element side in comparison with the conventional vehicle headlamp in which a relationship between the numbers of constituent light sources and optical elements is obtained as one constituent light source and two constituent optical elements made of a projecting lens and a shading member (1:2).

Further, the vehicle headlamp of the first aspect of the present invention is made of semiconductor-type light sources and lenses, thus eliminating a reflection material surface process of a reflecting surface of a reflector in comparison with a vehicle headlamp of reflection type of the reflector. As a result, the vehicle headlamp of the first aspect of the present invention becomes capable of eliminating a dispersion of light distribution control due to dispersion exerted by manufacture of the reflection material surface process of the reflection surface of the reflector and precisely and easily controlling light distribution accordingly.

In addition, the vehicle headlamp according to the second aspect of the present invention is suitable to obtain a light distribution pattern having cutoff lines, for example, a light distribution pattern for low beam, since a light distribution pattern is obtained in a such a manner that luminous intensity (illumination intensity, amount of light) of the central portion is the highest and becomes gradually lower from the central portion to the peripheral portion. Moreover, the vehicle headlamp according to the second aspect of the present invention allows the functions of the semiconductor light sources and lenses to be shared by the semiconductor-type light source and lens having the spot light distribution function and the semiconductor-type light source and lens having the diffused light distribution function, respectively. Therefore, even if light emission of the semiconductor-type light sources is small, it becomes possible to obtain sufficient luminous intensity (illumination intensity, amount of light), in particular, spot light distribution having sufficient luminous intensity (illumination intensity, amount of light) at the central portion of the light distribution pattern for low beam.

Further, the vehicle headlamp according to the third aspect of the present invention is optimal to obtain a light distribution pattern having cutoff lines (Z cutoff lines) made of: the upper horizontal cutoff line at the cruising lane side (left side); the oblique cutoff line at the cruising lane side (left side); and the lower horizontal cutoff line at the opposite lane side (right side), for example, the light distribution pattern for low beam. Moreover, a light distribution pattern having the Z cutoff lines, for example, the light distribution pattern LP for low beam can be reliably obtained. Moreover, the vehicle headlamp according to the third aspect of the present invention allows the long side of the light emitting chip of the semiconductor-type light source for spot light distribution to be inclined with respect to the horizontal axis and the long side of the light emitting chip of the semiconductor-type for diffused light distribution to be parallel to the horizontal axis, so that: the spot light distribution can be taken along the oblique cutoff line; and the diffused light distribution can be taken along the upper and lower horizontal cutoff lines, making it possible to reliably obtain a light distribution pattern having the Z cutoff lines, for example, a light distribution pattern for low beam.

DESCRIPTION OF THE PREFERRED EMBODIMENTS

Figure 1:
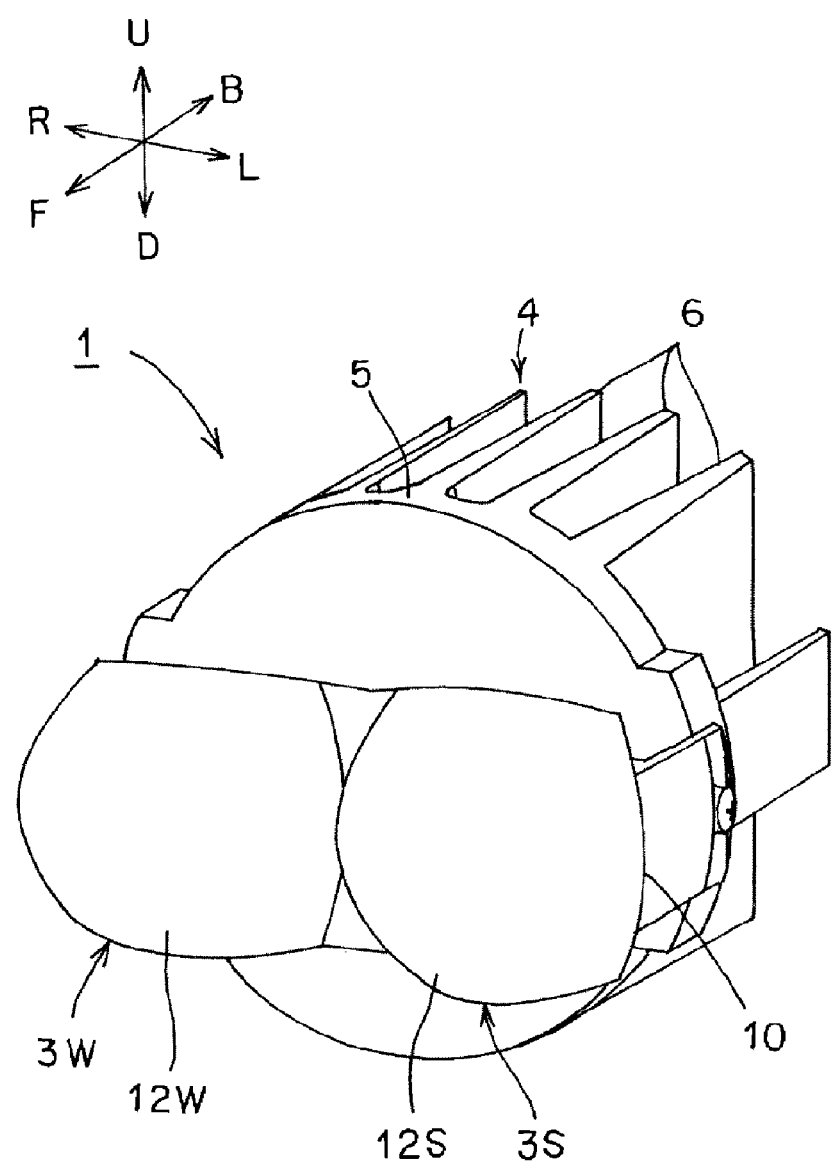
FIG. 1 is a perspective view of essential parts, showing an embodiment of a vehicle headlamp according to the present invention.

Hereinafter, a constitution of a vehicle headlamp of the embodiment will be described referring to the drawings. In the figures, reference numeral 1 designates a vehicle headlamp (automobile headlamp) of the embodiment. The vehicle headlamp 1 is a vehicle headlamp for left-side cruising lane. A vehicle headlamp for right-side cruising lane is laterally reversed in constitution of the vehicle headlamp 1 for left-side cruising lane. In addition, in FIG. 2, X, Y, and Z constitute an orthogonal coordinate system (X-Y-Z orthogonal coordinate system). The X axis corresponds to a horizontal axis in the transverse direction and on the opposite lane side. In other words, in the embodiment, the right side R corresponds to a positive direction, and the left side L corresponds to a negative direction. In addition, the Y axis corresponds to a vertical axis in the vertical direction, and in the embodiment, the upside U corresponds to a positive direction, and the downside D corresponds to a negative direction. Further, the Z axis corresponds to an axis in the forward/backward direction orthogonal to the X axis and the Y axis, and in the embodiment, the foreside F corresponds to a positive direction, and the backside B corresponds to a negative direction.

Figure 18:
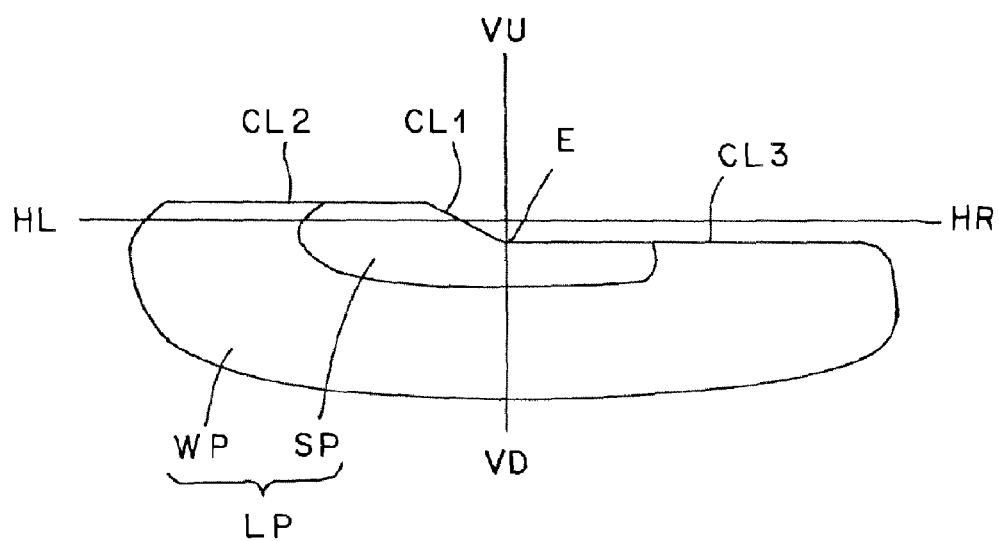
FIG. 18 is an explanatory view showing a light distribution pattern for low beam, which is obtained by combining the spot light distribution of FIGS. 16A to 16E and the diffused light distribution of FIGS. 17A to 17E with each other, similarly.

The vehicle headlamp 1, as shown in FIG. 18, is intended to illuminate light toward the forward direction of the vehicle (not shown), a light distribution pattern having cutoff lines (Z cutoff lines) made of: an oblique cutoff line CL1 with an upward gradient from an elbow point E to the cruising lane side (left side); an upper horizontal cutoff line CL2 which is horizontal from the oblique cutoff line CL1 to the cruising lane side; and a downward horizontal cutoff line CL3 from the elbow point E to the opposite lane side (right side), for example, a light distribution pattern for low beam (light distribution pattern for passing) LP. An angle formed between the oblique cutoff line CL1 and a horizontal line HL-HR of a screen is about 15 degrees. In addition, the elbow point E is on an upward-downward vertical line VU-VD; is more downward than a leftward-rightward horizontal line HL-HR; and is a crossing point between the oblique cutoff line CL1 and the downward horizontal cutoff line CL3.

Figure 2:
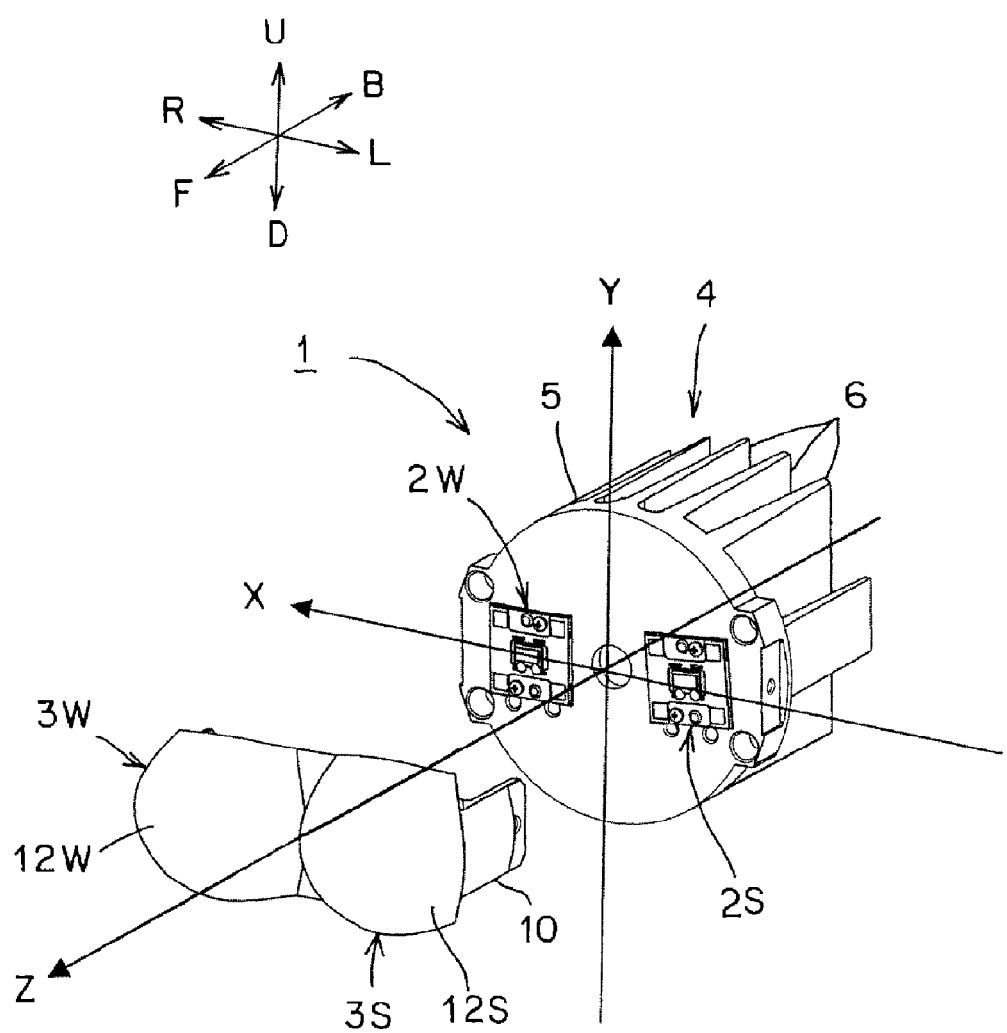
FIG. 2 is an exploded perspective view showing the essential parts, similarly.

The vehicle headlamp 1, as shown in FIG. 2, is made up of: a semiconductor-type light source 2S and a lens 3S for spot light distribution; and a semiconductor-type light source 2Y and 3W for diffused light distribution; a heat sink member 4; and a lamp housing and a lamp lens (such as a transparent outer lens, for example), although not shown.

The heat sink member 4 is made up of: a disk-shaped front portion 5 having a circular fixing face on a front face; and a fin-shaped rear portion 6 from an intermediate portion to a rear portion. The heat sink member 4 is made up of a resin member or a metal member with high thermal conductivity, for example.

The semiconductor-type light source 2S for spot light distribution and the semiconductor-type light source 2W for diffused light distribution (hereinafter, simply referred to as "semiconductor-type light sources 2S, 2W") are fixed, respectively, at the left and right of an intermediate portion in the vertical direction of a fixing face of a front portion 5 of the heat sink member 4. On the other hand, the lens 3S for spot light distribution and a lens 3W for diffused light distribution (hereinafter, simply referred to as "lenses 3S, 3W") are integrally constituted and disposed at a foreside F of the semiconductor-type light sources 2S, 2W, and are then fixed to a side face of the front portion 5 of the heat sink member 4.

The semiconductor-type light source 2S and lens 3S for spot light distribution; the semiconductor-type light source 2W and lens 3W for diffused light distribution; and the heat sink member 4 are all lamp units. In a lamp room partitioned by the lamp housing and the lamp lens, the lamp units 2S, 3S, 2W, 3W, 4 are disposed vertically around a horizontal axis and horizontally around a vertical axis to be adjustable about an optical axis, via an optical axis adjustment mechanism, for example. In the lamp room, there may be occasionally disposed other lamp units such as a fog lamp, a cornering lamp, a clearance lamp, and a cornering lamp, a clearance lamp, and a turn signal lamp, other than the lamp units 2S, 3S, 2W, 3W, 4.

The semiconductor-type light source 2S and lens 3S for spot light distribution have a function of forming a spot light distribution SP at a substantially central portion on a screen light distribution of the light distribution pattern LP for low beam, shown in FIG. 18. In addition, the semiconductor-type light source 2W and lens 3W for diffused light source have a function of forming a diffused light distribution WP of an entire portion on the screen light distribution of the light distribution pattern LP for low beam, shown in FIG. 18.

Figure 3:
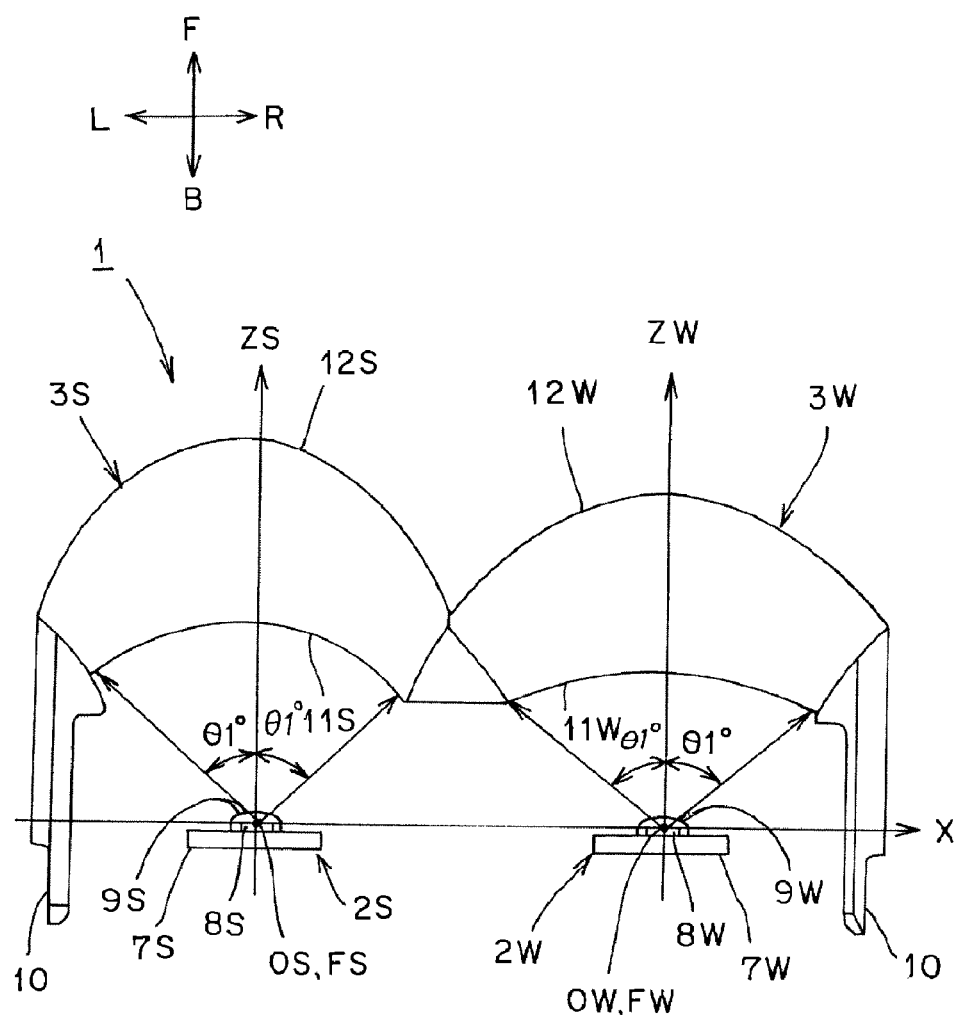
FIG. 3 is a plan view showing a semiconductor-type light source and a lens for spot light distribution and a semiconductor-type light source and a lens for diffused light distribution, similarly.
Figure 4:
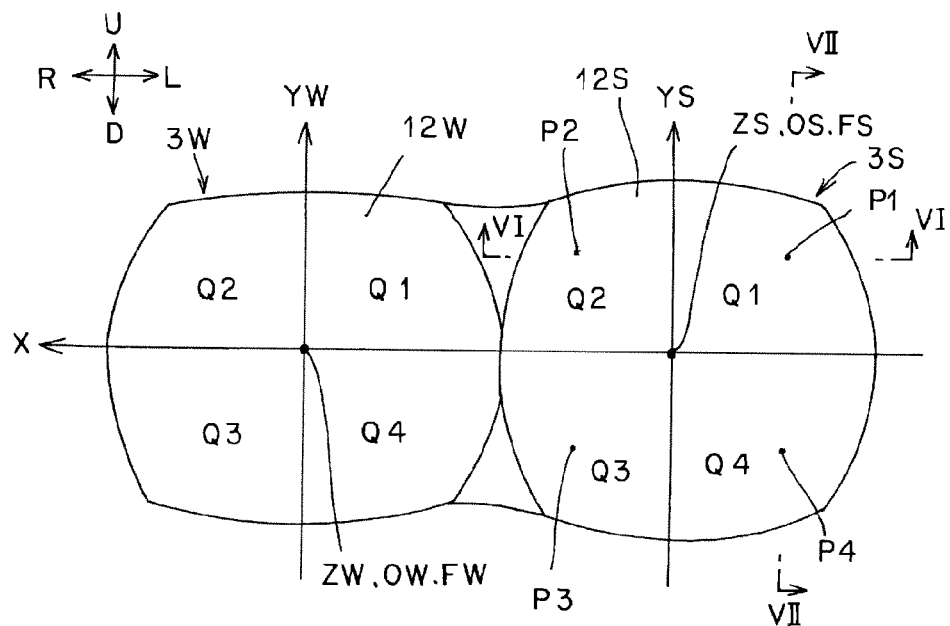
FIG. 4 is a front view showing the lens for spot light distribution and the lens for diffused light distribution, similarly.
Figure 5:
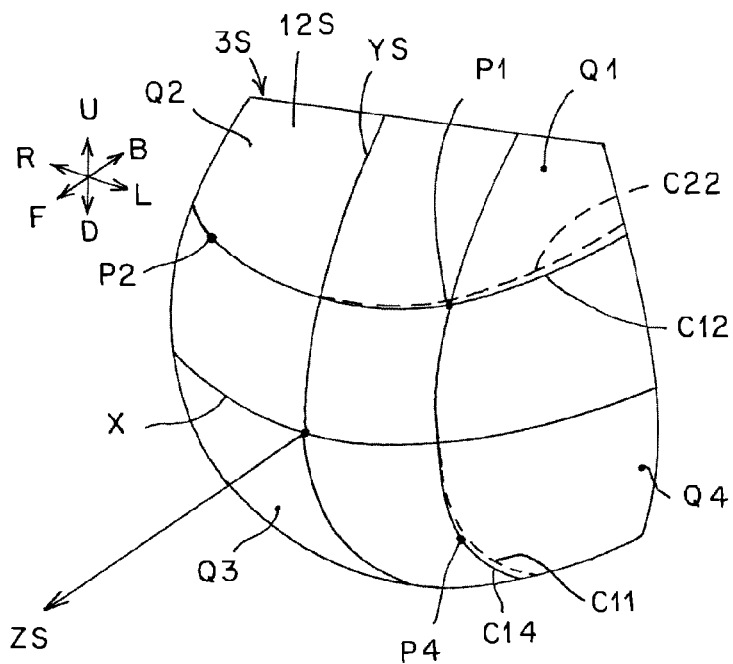
FIG. 5 is a perspective view showing the lens for spot light distribution, similarly.

The semiconductor-type light sources 2S, 2W, as shown in FIG. 3, are made up of: boards 7S, 7W; light emitting chips 8S, 8W which are provided on the board 7S, 7W; and a thin sealing resin member (lens members) 9S, 9W shaped like a rectangular prism, for sealing the light emitting chips 8S, 8W. A surface of the sealing resin members 9S, 9W is shaped like a convex curved face. The semiconductor-type light sources 2S, 2W are fixed, respectively, on fixing faces of the front portion 5 of the heat sink member 4, via a holder or a fixing frame.

Figure 10A:
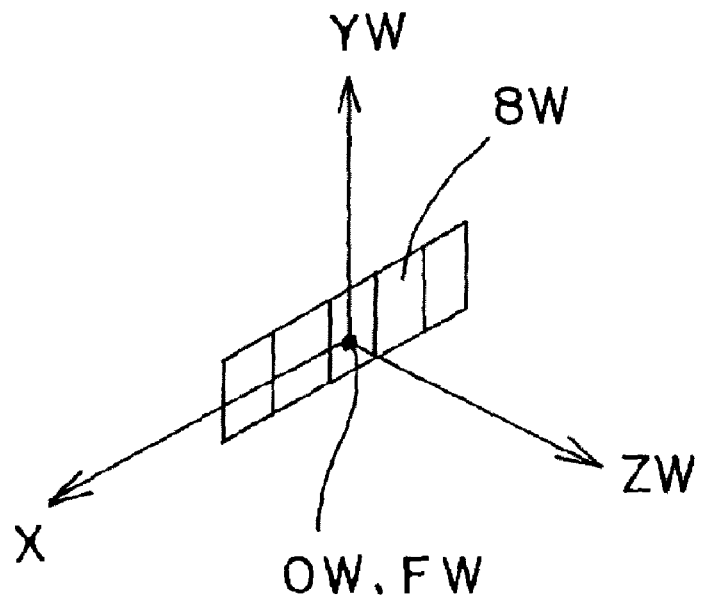
FIGS. 10A and 10B are explanatory views, each of which shows a light emitting chip of the semiconductor-type light source for diffused light distribution, similarly.
Figure 10B:
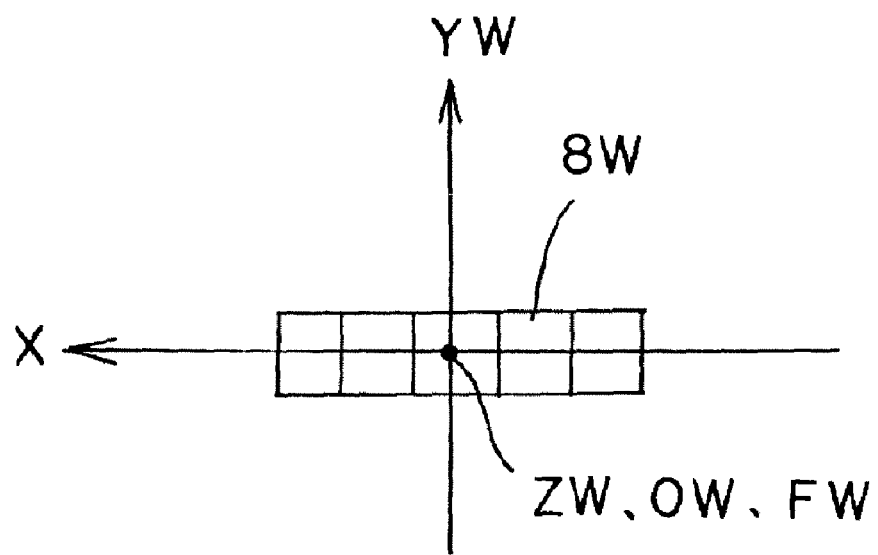
Figure 11A:
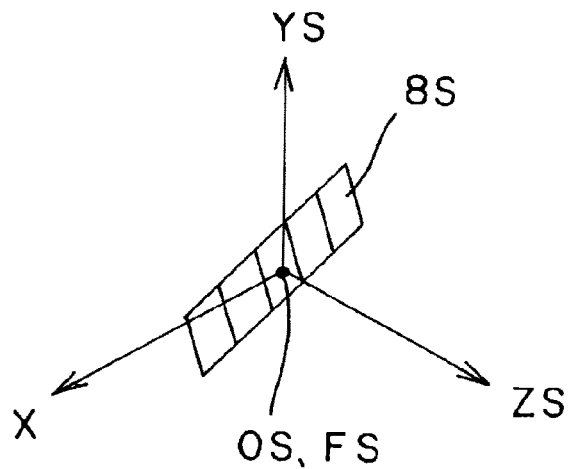
FIGS. 11A and 11B are explanatory views, each of which shows a light emitting chip of the semiconductor-type light source for spot light distribution, similarly.
Figure 11B:
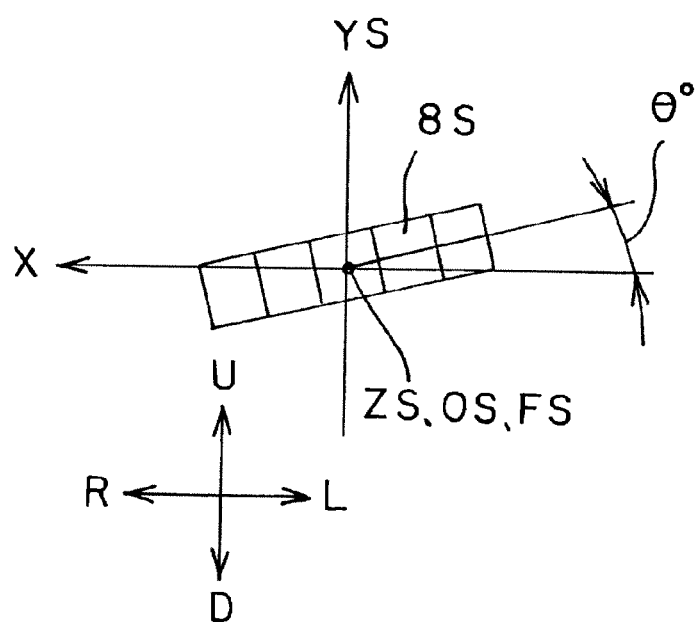

A respective one of the light emitting chips 8S, 8W, as shown in FIGS. 10 and 11, are shaped like a flat rectangle (flat oblong). In other words, five square chips are arrayed in an X-axis direction (horizontal direction). Alternatively, one rectangular chip may be used in place of these square chips.

Centers OS, OW of the light emitting chips 8S, 8W are positioned at or near reference focal points FS, FW of the lenses 3S, 3W, and are positioned on or near reference axes (optical axis) XS, ZW of the lenses 3S, 3W, respectively. The reference axes ZS, ZW of the lenses 3S, 3W are parallel to the Z axis and are normal lines passing through the centers OS, OW of the light emitting chips 8S, 8W, respectively. In FIGS. 10 and 11, YS, YW axes are parallel to the Y axis and are a vertical axis (Y axis) for spot light distribution and a vertical axis (Y axis) for diffused light distribution, passing through the centers OS, OW of the light emitting chips 8S, 8W, respectively.

Emission surfaces of the light emitting chips 8S, 8W are oriented to the foreside F (forward direction) of the reference axes ZS, ZW of the lens 3S, 3W, respectively. In addition, a long side of the light emitting chip 8S of the semiconductor-type light source 2W for diffused light distribution, as shown in FIG. 10, is parallel to the X axis (horizontal axis) orthogonal to the reference axis ZW of the lens 3W. On the other hand, a long side of the light emitting chip 8S of the semiconductor-type light source 2S for spot light distribution, as shown in FIG. 11, is inclined so that a cruising lane side (left side L in the embodiment) becomes more upward than an opposite lane side (right side R in the embodiment) with respect to the X axis, in a state in which the light emitting chip 8S of the semiconductor-type light source 2S for spot light distribution is rotated by 0 degrees (about 5 degrees, for example) around the reference axis ZS of the lens 3S.

The long side of the light emitting chip 8S of the semiconductor-type light source 2S for slot light distribution may be parallel to the X axis, like the one of the light emitting chip 8S of the semiconductor-type light source 2W for diffused light distribution. In addition, the long side of the light emitting chip 8S of the semiconductor-type light source 2S for spot light distribution may be inclined with respect to the X axis, like the one of the light emitting chip 8S of the semiconductor-type light source 2S for spot light distribution.

The lens 3S for spot light distribution and the lens 3W for diffused light distribution are constituted integrally with each other. A fixing portion 10 is integrally provided at a respective one of the left and right sides of the lenses 3S, 3W. The fixing portion 10 is fixed by means of tightening screws or the like, on a respective one of the left and right side faces of the front portion 5 of the heat sink member 4. As a result, the lenses 3S, 3W are fixed to the heat sink member 4.

The lenses 3S, 3W are provided with: incidence surfaces 11S, 11W to which light beams from the light emitting chips 8S, 8W of the semiconductor-type light sources 2S, 2W are incident; and emission surfaces 12S, 12W from which the light beams incident to the lenses 3S, 3W are emitted.

The incidence surfaces 11S, 11W of the lenses 3S, 3W are made of conical curved faces (a curve such as an ellipse, a circle, a parabola, or a hyperbola, or alternatively, a surface of the second order such as a flat face, for example). In the embodiment, the incidence surfaces 11S, 11W of the lenses 3S, 3W form convex faces (cylindrical faces) in a state in which a respective one of the central portions thereof is convexly curved to a backside B with respect to a peripheral portion. Although it is preferable that the incidence surfaces 11S, 11W of the lenses 3S, 3W form a convex face, they may form a concave face concaved on the foreside F with respect to the peripheral portion in the vertical cross section or may be flat. The light beams, which are formed at an angle leading up to θ1 degrees (for example, about 50 degrees or more, or alternatively, 60 degrees in the embodiment), from the centers OS, OW of the light emitting chips 8S, 8W of the semiconductor-type light sources 2S, 2W (reference axes ZS, ZW of the lenses 3S, 3W), are incident to the incidence surfaces 11S, 11W of the lenses 3S, 3W.

The emission surfaces 12S, 12W of the lenses 3S, 3W are made of free curved faces controlled to be curved so that: projection images of the light emitting chips 8S, 8W, emitted from the emission surfaces 12S, 12W of the lenses 3S, 3W, are not convexly curved in an upward direction from cutoff lines CL1, CL2, CL3 on a screen light distribution of the light distribution pattern LP for low beam; and a part of the projection images of the light emitting chips 8S, 8W is substantially in contact with the cutoff lines CL1, CL2, CL3.

Hereinafter, a curved face control of the emission surface 12S of the lens 3S for spot light distribution will be described referring to FIGS. 4 and 12 to 15.

First, the semiconductor-type light source 2S and the lens 3S, for the spot light distribution, are disposed so as to be constituted as described previously. A conical curved face of the incidence surface 11S of the lens 3S is fixed. On the other hand, a free curved face, of the emission surface 12S of the lens 3S, is defined as an initial free curved face.

Figure 12:
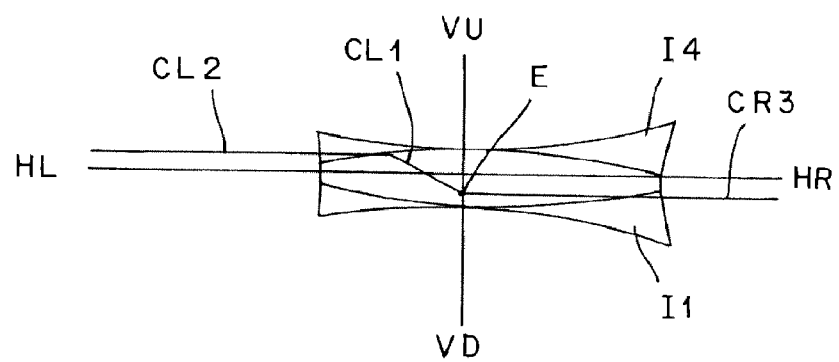
FIG. 12 is an explanatory view showing a projection image of the light emitting chip of the semiconductor-type light source for spot light distribution, which is emitted from a first quadrant and a fourth quadrant when an emission surface of the lens for slot light distribution is in an initial state, similarly.
Figure 13:
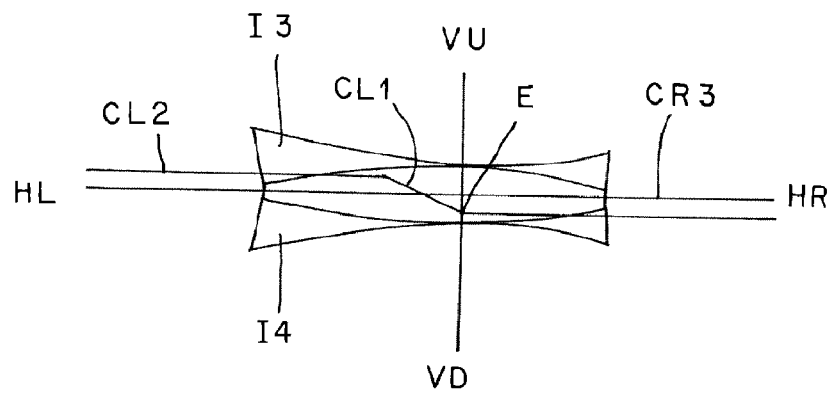
FIG. 13 is an explanatory view showing a projection image of the light emitting chip of the semiconductor-type light source for spot light distribution, which is emitted from a second quadrant and a third quadrant when the emission surface of the lens for slot light distribution is in an initial state, similarly.

Next, a light emitting chip 8S of the semiconductor-type light source 2S is lit to emit light. A projection image group of the light emitting chip 8S is screen-projected (emitted). Hereinafter, a description will be given with respect to projection images I1, I2, I3, I4 of the light emitting chip, to be emitted from sampling points P1, P2, P3, P4 of the emission surface 12S of the lens 3S shown in FIG. 4. The projection images I1, I2, I3, I4 of the light emitting chip 8S are screen-projected (emitted), as shown in FIGS. 12 and 13. At this time, since a free curved face of the emission surface 12S of the lens 3S is an initial free curved face, a part of the screen-projected projection images I1, I2, I3, I4 (a half or more portion) projects upward from the cutoff lines CL1, CL2, CL3 on the screen light distribution of the light distribution pattern LP for low beam.

Figure 14:
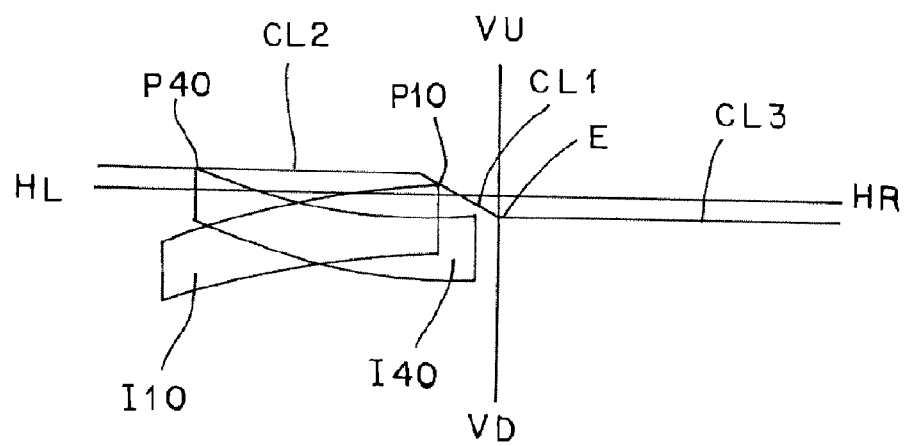
FIG. 14 is an explanatory view showing a projection image of the light emitting chip of the semiconductor-type light source for spot light distribution, which is emitted from the first quadrant and the fourth quadrant when the emission surface of the lens for slot light distribution is controlled to be curved, similarly.
Figure 15:
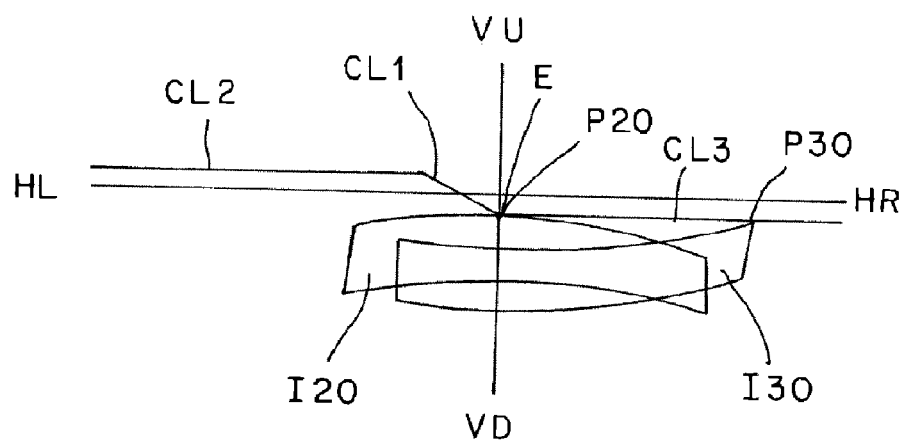
FIG. 15 is an explanatory view showing a projection image of the light emitting chip of the semiconductor-type light source for spot light distribution, which is emitted from the second quadrant and the third quadrant when the emission surface of the lens for slot light distribution is controlled to be curved, similarly.

Afterwards, the projection images I1, I2, I3, I4 shown in FIGS. 12 and 13 are design-modified to projection images I10, I20, I30, I40 shown in FIGS. 14 and 15. Parts P10, P20, P30, P40 of the design-modified projection images I10, I20, I30, I40 are substantially in contact with the cutoff lines CL1, CL2, CL3 on the screen light distribution of the light distribution pattern LP for low beam; and the design-corrected projection images I10, I20, I30, I40 are not convexly curved in an upward direction from the cutoff lines CL1, CL2, CL3 on the screen light distribution of the light distribution pattern LP for low beam.

Afterwards, a free curved face of the emission surface 12S of the lens 3S for spot light distribution is controlled so that the design-modified projection images I10, I20, I30, I40 are obtained. In such a manner as described above, the free curved face of the emission surface 12S of the lens 3S for spot light distribution is obtained. Further, the one of the emission surface 12W of the lens 3S for diffused light distribution is obtained, similarly.

Figure 6:
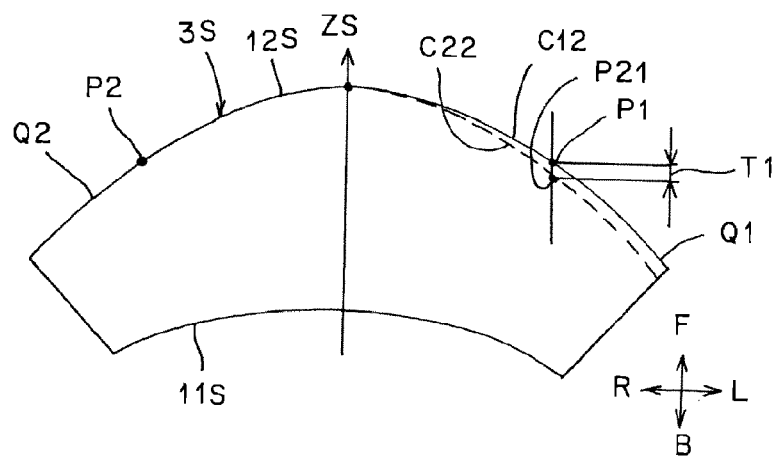
FIG. 6 is a cross-sectional view taken along the line VI-VI of FIG. 4, showing the lens for spot light distribution, similarly.
Figure 7:
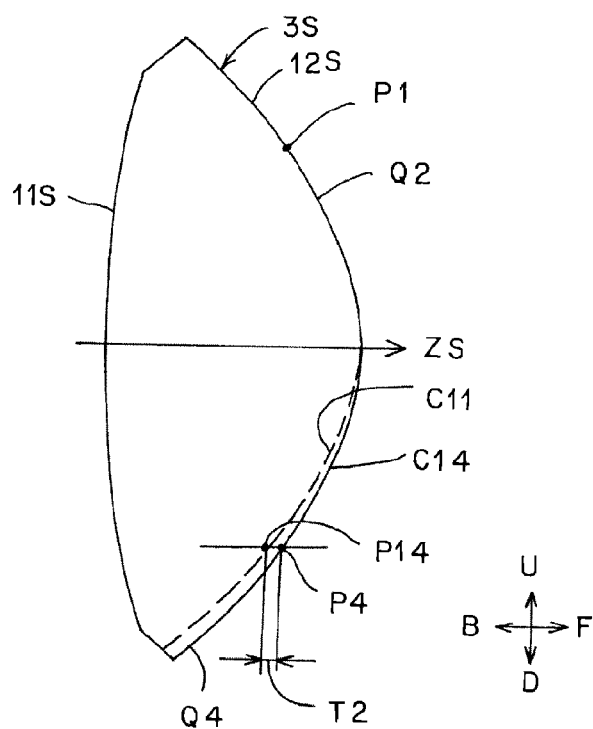
FIG. 7 is a cross-sectional view taken along the line VII-VII of FIG. 4, showing the lens for spot light distribution, similarly.
Figure 8:
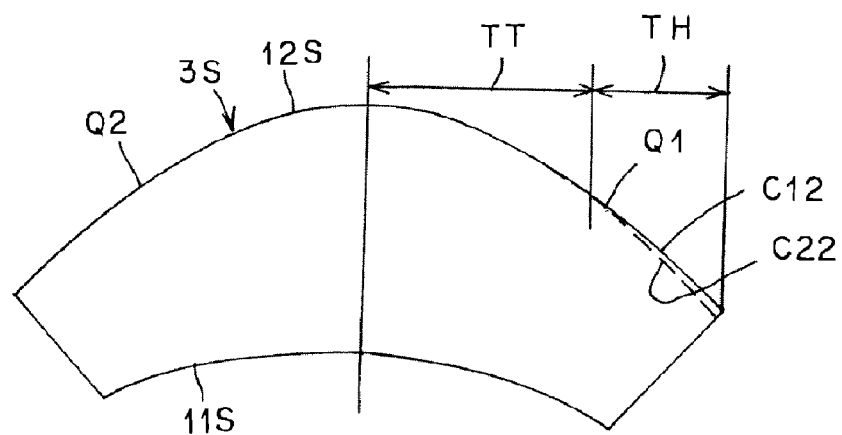
FIG. 8 is a cross-sectional view corresponding to FIG. 7, showing a modified example of the lens for slot light distribution, similarly.
Figure 9:
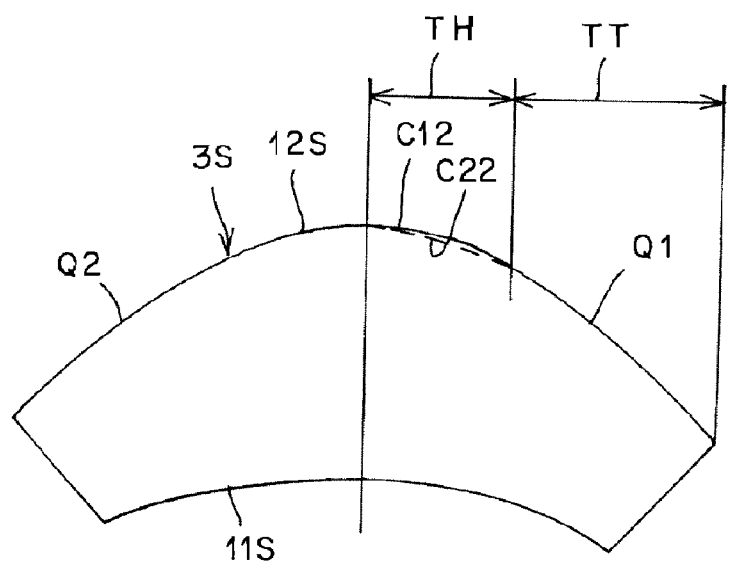
FIG. 9 is a cross-sectional view corresponding to that of FIG. 7, showing a modified example of the lens for slot light distribution, similarly.

The free curved faces of the emission surfaces 12S, 12W of the lenses 3S, 3W, which are controlled to be curved as described above, have the following features. In other words, as shown in FIGS. 4 to 7, in a state in which the reference axes ZS, ZW of the lenses 3S, 3W are defined as origins in a front view (the state seen from the foreside F), the free curved faces of the emission surfaces 12S, 12W of the lens 3S, 3W are divided into a first quadrant Q1, a second quadrant Q2, a third quadrant Q3, and a fourth quadrant Q4 by means of the vertical axes YS, YW and an X axis serving as a horizontal axis, the axis passing through the origin and being orthogonal to each other. Hereinafter, in the lens 3S for spot light distribution, in a case where the first quadrant Q1 and the second quadrant Q2 are compared with each other in a symmetrical position relationship with respect to the vertical axis YS, i.e., in a case where a sectional curve C12 in the first quadrant Q1, passing through the first sampling point P1 and the second sampling point P2, the sectional curve being obtained when the first quadrant Q1 and the second quadrant Q2 of the lens 3S for spot light distribution, are cut on a horizontal face parallel to the X axis as the horizontal axis passing the first sampling point P1 and the second sampling point P2, is compared with an inverted sectional curve C22 of the second quadrant Q2 in the first quadrant Q1, which is a sectional curve in the second quadrant Q2 and is inverted around the vertical axis YS, a portion of about ⅓ or more of the first quadrant Q1 (all of the first quadrant in the embodiment) is higher than the second quadrant Q2 in the forward direction (foreside F) of the reference axis ZS of the lens 3S. As shown in FIG. 6, for example, in a case where the first sampling point P1 in the first quadrant Q1 is compared with an inversion point P21 of the second sampling point P2 of the second quadrant Q2 in the first quadrant Q1, the first sampling point P1 in the first quadrant Q1 is higher by a dimension T1 in the foreside F than the inversion point P21 of the second sampling point P2 of the second quadrant Q2 in the first quadrant Q1. A portion TH, which becomes higher than the second quadrant Q2 of the first quadrant Q1, is from about ⅓ to 1 (⅓<TH≦1). The portion TH which becomes higher, as shown in FIG. 8, may start from an edge of the lens 3S. Alternatively, as shown in FIG. 9, it may start from a center of the lens 3S. Further, although not shown, it may start from an intermediate position between an edge and a center of the lens 3S. In FIGS. 8 and 9, a portion TT is the one having the same height as that of the second quadrant Q2 of the first quadrant Q1.

In the lens 3S for spot light distribution, in a case where the first quadrant Q1 and the fourth quadrant Q4 are compared with each other in a symmetrical position relationship with respect to the X axis as the horizontal axis, i.e., in a case where a sectional curve C14 in the fourth quadrant Q4, passing through the first sampling point P1 and the fourth sampling point P4, the sectional curve being obtained when the first quadrant Q1 and the fourth quadrant Q4 of the lens 3S for spot light distribution, are cut on a vertical face parallel to the vertical axis S passing through the first sampling point P1 and the fourth sampling point P4 is compared with an inverted sectional curve C11 of the first quadrant Q1 in the fourth quadrant Q4, which is a sectional curve in the first quadrant Q1 and is inverted around the X axis as the horizontal axis, a portion of about ⅓ or more of the first quadrant Q1 is lower than the fourth quadrant Q4 in the forward direction (foreside F) of the reference axis ZS of the lens 3S. As shown in FIG. 7, for example, in a case where the fourth sampling point P4 in the fourth quadrant Q4 is compared with an inversion point P14 of the first sampling point P1 of the first quadrant Q1 in the fourth quadrant Q4, the inversion point P14 of the first sampling point P1 of the first quadrant Q1 in the fourth quadrant Q4 is lower than the fourth sampling point P4 in the fourth quadrant Q4 by a dimension T2 in the foreside F. A portion, which becomes lower than the fourth quadrant Q4 of the first quadrant Q1, is from about ⅓ to all. The portion that becomes lower may start from an end of the lens 3S, or alternatively, may start from a center of the lens 3S. Further, it may start from an intermediate portion between the edge and the center of the lens 3S.

On the other hand, a free curved face of the emission surface 12W of the lens 3W for diffused light distribution also has a feature similar to that of the emission surface 12S of the lens 3S for spot light distribution. In other words, the free curved face of the emission surface 12W of the lens for diffused light distribution is made of a free curved face such that: in a case where the first quadrant Q1 and the second quadrant Q2 are compared with each other in a symmetrical position relationship with respect to the vertical axis YW, a portion of about ⅓ or more of the first quadrant Q1 is higher than the second quadrant Q2 in the forward direction of the reference axis ZW of the lens 3W; and in a case where the first quadrant Q1 and the fourth quadrant Q4 are compared with each other in a symmetrical position relationship with respect to the X axis as the horizontal axis, the portion of about ⅓ or more of the first quadrant Q1 is lower than the fourth quadrant Q4 in the forward direction of the reference axis ZW of the lens 3W.

Hereinafter, the projection images I10, I20, I30, I40 of the light emitting chips 8S, 8W, which are emitted from four sampling points P1, P2, P3, P4 of the emission surfaces 12S, 12W controlled to be curved, of the lenses 3S, 3W, are design-modified from the states of FIGS. 12 and 13 and to the state of FIGS. 14 and 15.

Figure 16A:
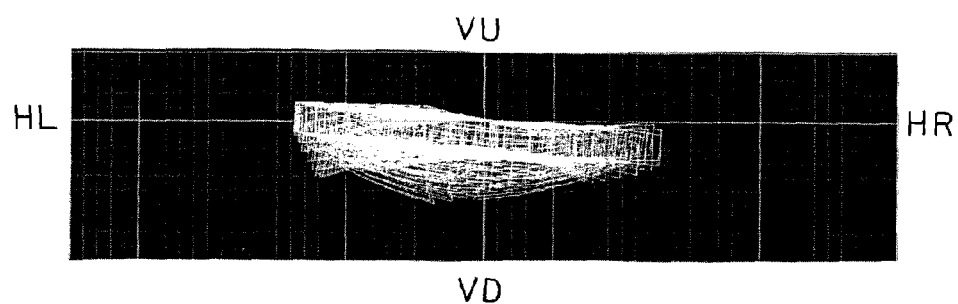
FIGS. 16A, 16B, 16C, 16D, and 16E are explanatory views, each of which shows a spot light distribution obtained by means of a lamp unit made of the semiconductor-type light source and lens for spot light distribution (a projection image group of the light emitting chip of the semiconductor-type light source for spot light distribution), similarly.
Figure 16B:
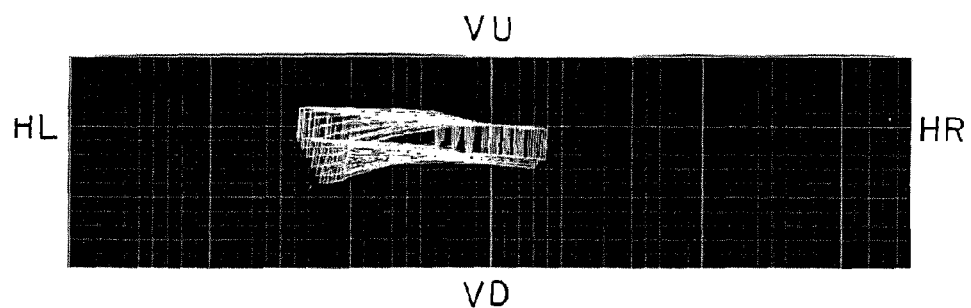

As a result, as shown in FIG. 16B, the projection image group of the light emitting chip 8S, which is emitted from the first quadrant Q1 of the light emission surface 12S of the lens 3S for spot light distribution, mainly forms a light distribution of the cruising lane side (left side) from the elbow point E on the screen light distribution of the light distribution pattern LP for low beam.

Figure 16C:
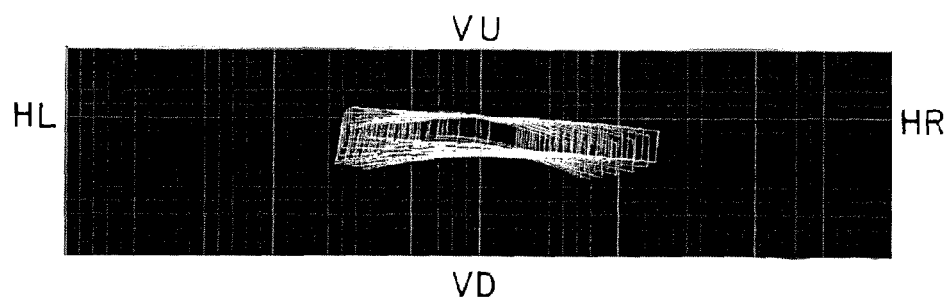

In addition, as shown in FIG. 16C, the projection image group of the light emitting chip 8S, which is emitted from the second quadrant Q2 of the emission surface 12S of the lens 3S for spot light distribution, mainly forms a light distribution of the opposite lane side (right side) from the elbow point E on the screen light distribution of the light distribution pattern LP for low beam.

Figure 16D:
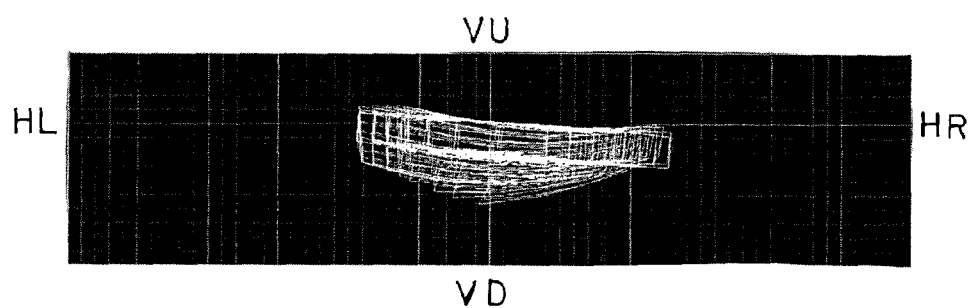

Further, as shown in FIG. 16D, the projection image group of the light emitting chip 8S, which is emitted from the third quadrant Q3 of the emission surface 12S of the lens 3S for spot light distribution, mainly forms a light distribution of the opposite lane side (right side) from the elbow point E on the screen light distribution of the light distribution pattern LP for low beam.

Figure 16E:
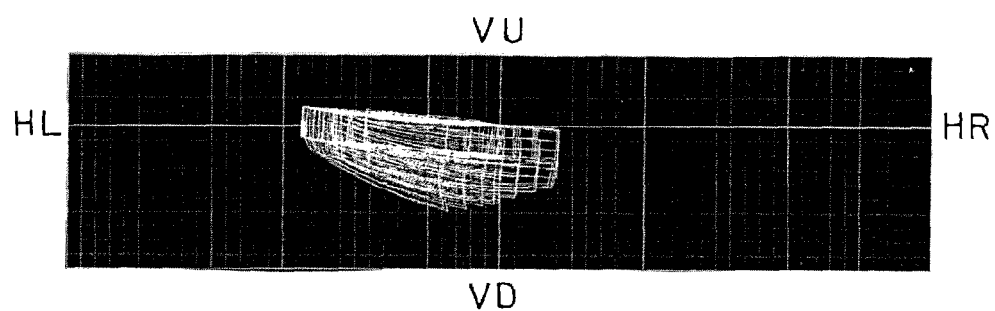

Furthermore, as shown in FIG. 16E, the projection image group of the light emitting chip 8S, which is emitted from the fourth quadrant Q4 of the emission surface 12S of the lens 3S for spot light distribution, mainly forms a light distribution of the cruising lane side (left side) from the elbow point E on the screen light distribution of the light distribution pattern LP for low beam.

Afterwards, a spot light distribution SP of the light distribution pattern LP for low beam, shown in FIG. 16A, is formed by combining the light distributions shown in FIGS. 16B, 16C, 16D, and 16E with each other.

Figure 17A:
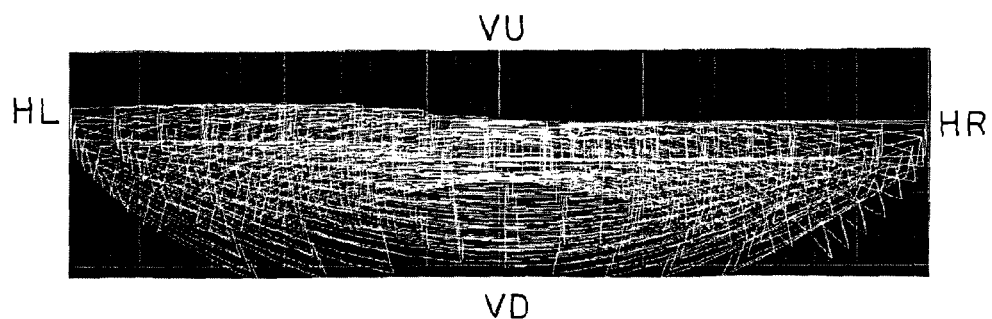
FIGS. 17A, 17B, 17C, 17D, and 17E are explanatory views, each of which shows a diffused light distribution obtained by means of the lamp unit made of the semiconductor-type light source and lens for spot light distribution (a projection image group of the light emitting chip of the semiconductor-type light source for diffused light distribution), similarly.
Figure 17B:
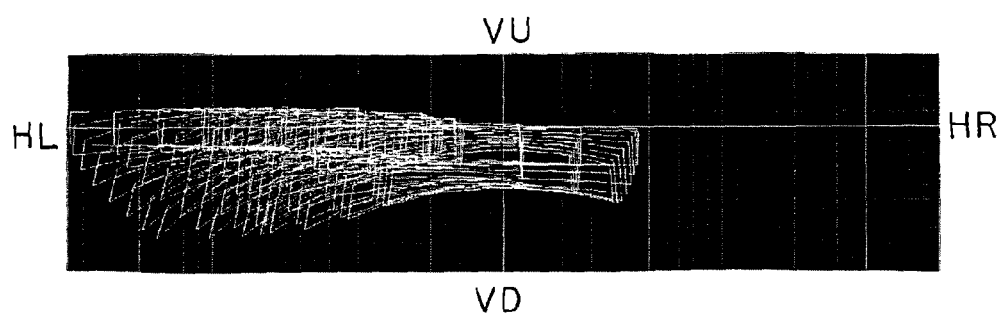

On the other hand, as shown in FIG. 17B, the projection image group of the light emitting chip 8W, which is emitted from the first quadrant Q1 of the light emission surface 12W of the lens 3W for spot light distribution, mainly forms a light distribution of the cruising lane side (left side) from the elbow point E on the screen light distribution of the light distribution pattern LP for low beam.

Figure 17C:
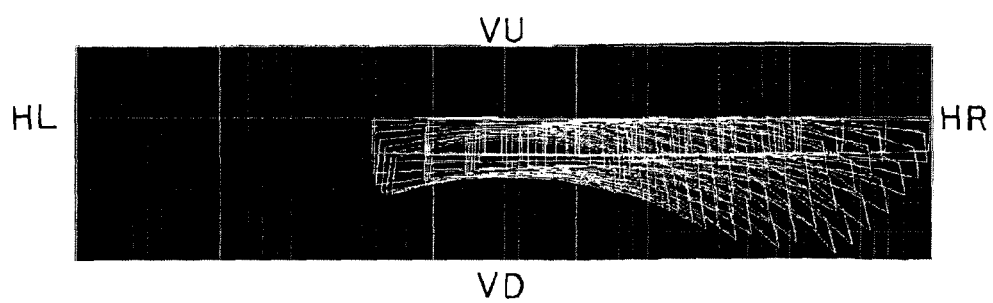

In addition, as shown in FIG. 17C, the projection image group of the light emitting chip 8W, which is emitted from the second quadrant Q2 of the light emission surface 12W of the lens 3W for spot light distribution, mainly forms a light distribution of the opposite lane side (right side) from the elbow point E on the screen light distribution of the light distribution pattern LP for low beam.

Figure 17D:
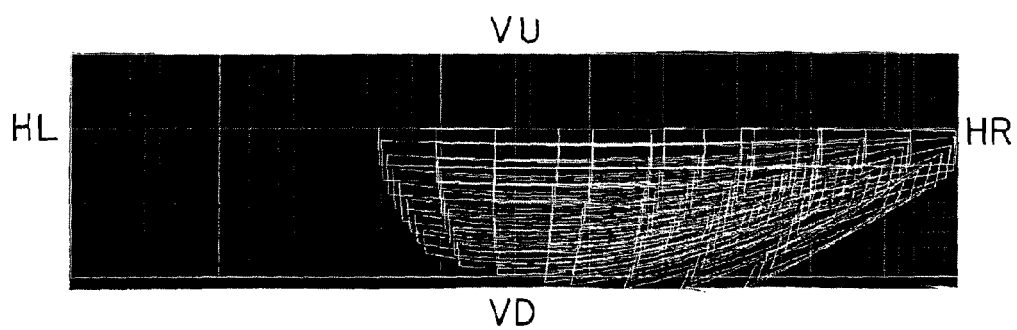

Further, as shown in FIG. 17D, the projection image group of the light emitting chip 8W, which is emitted from the third quadrant Q3 of the light emission surface 12W of the lens 3W for spot light distribution, mainly forms a light distribution of the opposite lane side (right side) from the elbow point E on the screen light distribution of the light distribution pattern LP for low beam.

Figure 17E:
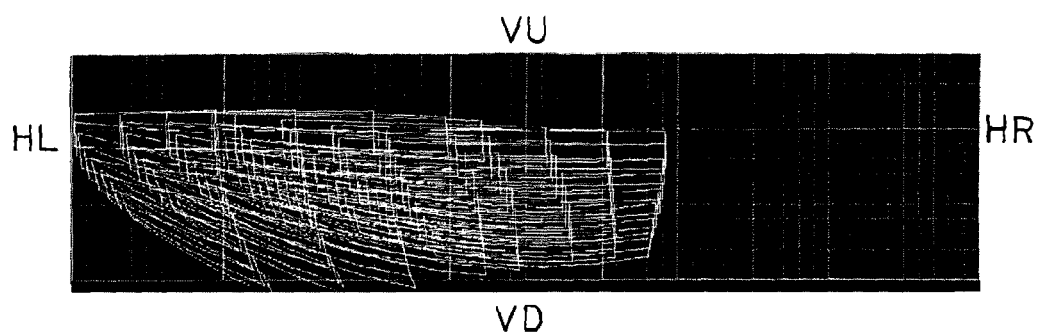

Furthermore, as shown in FIG. 17E, the projection image group of the light emitting chip 8W, which is emitted from the fourth quadrant Q4 of the light emission surface 12W of the lens 3W for spot light distribution, mainly forms a light distribution of the cruising lane side (left side) from the elbow point E on the screen light distribution of the light distribution pattern LP for low beam.

Afterwards, a spot light distribution SP of the light distribution pattern LP for low beam, shown in FIG. 17A, is formed by combining the light distributions shown in FIGS. 17, 17C, 17D, and 17E with each other.

The vehicle headlamp 1 of the present embodiment is made of the abovementioned constituent elements, and hereinafter, relevant functions thereof will be described.

First, the light emitting chips 8S, 8W of the semiconductor-type light sources 2S, 2W of the vehicle headlamp 1 are lit to emit light. The light is then radiated from the light emitting chip 8S, 8W of the semiconductor-type light sources 2S, 2W. The light is incident from the incidence surfaces 11S, 11W of the lenses 3S, 3W, and then, is emitted from the emission surfaces 12S, 12W of the lenses 3S, 3W. At this time, the projection images I10, I20, I30, I40 of the light emitting chips 8S, 8W are emitted so that they are not convexly curved in an upward direction from the cutoff lines CL1, CL2, CL3 on the screen light distribution of the light distribution pattern LP for low beam and are substantially in contact with the cutoff lines CL1, CL2, CL3.

As a result, the spot light distribution SP of the light distribution pattern LP for low beam, shown in FIG. 16, and the diffused light distribution WP of the light distribution pattern LP for low beam, shown in FIG. 17, are obtained respectively, and they are combined with each other, whereby the light distribution pattern LP for low beam, shown in FIG. 18, is obtained.

In such a manner as described above, the light distribution pattern LP for low beam, shown in FIG. 18, is illuminated toward a forward direction of a vehicle.

The vehicle headlamp 1 of the present embodiment is made of the abovementioned constituent elements and functions, and hereinafter, advantageous effect(s) thereof will be described.

In the vehicle headlamp 1 of the embodiment, if the light emitting chips 8S, 8W of the semiconductor-type light sources 2S, 2W are lit to emit light, when the light radiated from the light emitting chips 8S, 8W is incident from the incidence surfaces 11S, 11W of the lenses 3S, 3W and is emitted from the emission surfaces, the projection images I10, I20, I30, I40 of the light emitting chips 8S, 8W, which are substantially in contact with the cutoff lines CL1, CL2, CL3, are emitted so as not to convex in an upward direction from the cutoff lines CL1, CL2, CL3 on the screen light distribution of the light distribution pattern LP for low beam, so that the light distribution pattern LP for low beam, having the cutoff lines CL1, CL2, CL3, can be obtained by means of the semiconductor-type light sources 2S, 2W and the lenses 3S, 3W.

Moreover, the vehicle headlamp 1 of the embodiment is made of the semiconductor-type light source 2S, 2W and the lenses 3S, 3W, so that: the number of components is reduced in comparison with the conventional vehicle headlamp; and downsizing, weight reduction, and cost reduction can be achieved accordingly. Moreover, the vehicle headlamp of the embodiment allows a relationship between the numbers of constituent light sources and optical elements to be obtained as one set of constituent semiconductor-type light sources 2S, 2W and one set of constituent elements made of lenses 3S, 3W (1:1). As a result, the vehicle headlamp 1 of the embodiment become capable of eliminating an error of combination in dispersions at the optical element side and improving the precision of assembling of the lenses 3S, 3W at the optical element side, in comparison with the conventional vehicle headlamp in which a relationship between the numbers of constituent light sources and optical elements is obtained as one constituent light source and two constituent optical elements made of a projecting lens and a shading member (1:2).

Further, the vehicle headlamp 1 of the embodiment is made of semiconductor-type light sources and lenses, thus eliminating a need for a reflection material surface process of a reflecting surface of a reflector in comparison with a vehicle headlamp of reflection type of the reflector. As a result, the vehicle headlamp 1 of the embodiment eliminates a dispersion of light distribution control due to dispersion exerted by manufacture of the reflection material surface process of the reflection surface of the reflector, allowing a light distribution to be precisely and easily controlled accordingly.

In addition, the vehicle headlamp 1 of the embodiment allows a spot light distribution SP to be obtained by means of the semiconductor-type light source 2S and lens 3S for spot light distribution and a diffused light distribution WP to be obtained by means of the semiconductor-type light source 2S and lens 3W for diffused light distribution. Thus, the vehicle headlamp 1 of the embodiment is suitable to obtain a light distribution pattern having cutoff lines CL1, CL2, CL3, for example, a light distribution pattern LP for low beam, since there is obtained a light distribution pattern in which luminous intensity (illumination intensity, amount of light) of the central portion is the highest and becomes gradually lower from the central portion to the peripheral portion. Moreover, the vehicle headlamp 1 of the embodiment allows the functions of the semiconductor light sources and lenses to be shared by the semiconductor-type light source 2S and lens 3S having the spot light distribution function and the semiconductor-type light source 2W and lens 2W having the diffused light distribution function, respectively. Thus, even if light emission of the semiconductor-type light sources 2S, 2W is small, sufficient luminous intensity (illumination intensity, amount of light), in particular, spot light distribution having sufficient luminous intensity (illumination intensity, amount of light) at the central portion of the light distribution pattern LP for low beam, is obtained.

Further, the vehicle headlamp 1 of the embodiment allows a long side of the light emitting chip 8S of the semiconductor-type light source 2S for slot light distribution to be inclined with respect to the X axis as a horizontal axis and a long side of the light emitting chip 8W of the semiconductor-type light source 2W for diffused light distribution to be parallel to the X axis as a horizontal axis, so that: the spot light distribution SP can be taken along the oblique cutoff line CL1; and the diffused light distribution WP can be taken along the upper horizontal cutoff line CL2 and the lower cutoff line CL3. Thus, the vehicle headlamp 1 of the embodiment is suitable to obtain a light distribution pattern having cutoff lines (Z cutoff lines) made of: the upper horizontal cutoff line CL2 at the cruising lane side (left side); the oblique cutoff line CL1 at the cruising lane side (left side); and the lower horizontal cutoff line CL3 at the opposite lane side (right side), for example, the light distribution pattern LP for low beam, and moreover, a light distribution pattern having the Z cutoff lines, for example, the light distribution pattern LP for low beam can be reliably obtained.

The foregoing embodiment described a light distribution pattern LP for low beam as a light distribution pattern. However, in the present invention, as a light distribution pattern, there may be a light distribution pattern other than the light distribution pattern LP for low beam, for example, a light distribution pattern having cutoff lines, such as a high distribution pattern for expressway or a light distribution pattern for fog lamp.

In addition, the foregoing embodiment described Z cutoff lines made of an oblique cutoff line CL1, an upper horizontal cutoff line CL2, and a lower horizontal cutoff line CL3, as a cutoff line. However, in the present invention, as a cutoff line, there may be a cutoff line other than the Z cutoff lines, for example, a merely horizontal cutoff line, or alternatively, a cutoff line made of an oblique cutoff line at the cruising lane side and a horizontal cutoff line at the opposite lane side with an elbow point serving as a boundary.

Further, the foregoing embodiment described a vehicle headlamp 1 for left-side cruising lane. However, the present invention is applicable to a vehicle headlamp for right-side cruising lane.

Furthermore, in the foregoing embodiment, a semiconductor-type light source 2S and a lens 3S for spot light distribution and a semiconductor-type light source 2W and a lens 3W for diffused light distribution were disposed in juxtaposition in the X-axis direction. However, in the present invention, the semiconductor-type light source 2S and the lens 3S for spot light distribution and the semiconductor-type light source 2W and the lens 3W for diffused light distribution may be disposed in the vertical direction; may be disposed in the vertical left or right oblique direction; or may be disposed alternately forward/backward.

Still furthermore, in the foregoing embodiment, the vehicle headlamp is made up of: a lamp unit made of the semiconductor light source 2S and lens 3S for spot light distribution; and a lamp unit made of the semiconductor-type light source 2W and lens 3W for diffused light distribution. However, in the present invention, a light distribution pattern having cutoff lines may be formed by one lamp unit made of one semiconductor-type light source and one lens or a light distribution pattern having cutoff lines may be formed by three or more lamp units.

What is claimed is:

1. A vehicle headlamp, comprising:
   (i) a semiconductor-type light source having a light emitting chip shaped like a planar rectangle; and
   (ii) a lens adapted to illuminate light from the light emitting chip of the semiconductor-type light source toward a forward direction of a vehicle, as a light distribution pattern having cutoff lines, wherein:
   a center of the light emitting chip is positioned at or near a reference focal point of the lens and is positioned on or near a reference axis of the lens;
   a light emitting face of the light emitting chip is oriented toward a forward direction of the reference axis of the lens;
   a long side of the light emitting chip is parallel to a horizontal axis orthogonal to the reference axis of the lens or is inclined with respect to the horizontal axis;
   an incidence surface of the lens is made of a conical curved face;
   an emission surface of the lens is made of a free curved face controlled to be curved so that a protection image of the light emitting chip, which is emitted from the emission surface of the lens face, is not convexly curved in an upward direction from the cutoff line on a screen light distribution of the light distribution pattern and so that a part of the projection image of the light emitting chip is substantially in contact with the cutoff line; and
   the free curved face of the emission surface of the lens includes a first quadrant, a second quadrant, a third quadrant, and a fourth quadrant which are divided by a vertical axis and a horizontal axis orthogonal to each other and passing through an origin, with a reference axis of lens serving as the origin in a front view, and is made of a free curved face on which: in a case where the first quadrant and the second quadrant are compared with each other in a symmetrical position relationship with respect to the vertical axis, a portion of about ⅓ or more of the first quadrant is higher than the second quadrant in a forward direction of the reference axis of the lens; and in a case where the first quadrant and the fourth quadrant are compared with each other in a symmetrical position relationship with respect to the horizontal axis, the portion of about ⅓ or more of the first quadrant is lower than the fourth quadrant in the forward direction of the reference axis of the lens.

2. The vehicle headlamp according to claim 1, wherein:
   the semiconductor-type light source and the lens comprise:
   a semiconductor-type light source and a lens for spot light distribution, which has a function of a spot light distribution at a substantial central portion on a screen light distribution of the light distribution pattern; and
   a semiconductor-type light source and a lens for diffused light distribution, which serve to implement a diffused light distribution of an entire portion on the screen light distribution of the light distribution pattern.

3. The vehicle headlamp according to claim 2, wherein:
   the cutoff line of the light distribution pattern is made of:
   an oblique cutoff line of an upward gradient from an elbow point to a cruising lane side;
   an upper horizontal cutoff line which is horizontal from the oblique cutoff line to the cruising lane side; and
   a lower horizontal cutoff line which is horizontal from the elbow point to an opposite lane side,
   a long side of the light emitting chip of the semiconductor-type light source for spot light distribution is inclined with respect to the horizontal axis by rotating the long side by about 5 degrees so that the cruising lane side becomes upper than the opposite lane side with respect to the horizontal axis around the reference axis of the lens;
   a long side of the light emitting chip of the semiconductor-type light source for diffused light distribution is parallel to the horizontal axis;
   a projection image of the light emitting chip, which is emitted from the first quadrant and the fourth quadrant of an emission surface of the lenses for spot light distribution and for diffused light distribution, mainly forms a light distribution on the cruising lane side from the elbow point on the screen light distribution of the light distribution pattern; and
   a projection image of the light emitting chip, which is emitted from the second quadrant and the third quadrant of an emission surface of the lenses for spot light distribution and for diffused light distribution, mainly forms a light distribution on the opposite lane side from the elbow point on the screen light distribution of the light distribution pattern.

4. A vehicle headlamp, comprising:
   (i) a light source; and
   (ii) a lens including an emission surface made of a free curved face, adapted to illuminate light from the light source toward a forward direction of a vehicle, as a light distribution pattern having cutoff lines, wherein:
   a center of the light source is position at or near a reference focal point of the lens and is position on or near a reference axis of the lens;
   a light emitting face of the light source is oriented in a forward direction of the reference axis of the lens;
   a long side of the light source is parallel to a horizontal axis orthogonal to the reference axis of the lens or is inclined relative to the horizontal axis;
   a free curved face of an emission surface of the lens includes a first quadrant, a second quadrant, a third quadrant, and a fourth quadrant which are divided by a vertical axis and a horizontal axis orthogonal to each other and passing through an origin, with the reference axis of the lens serving as an origin of the lens in a front view,
   the first quadrant has a predetermined height relationship in a forward direction of the reference axis of the lens with respect to the second quadrant in the vertical axis and the fourth quadrant in the horizontal axis, respectively, and:
   the emission surface of the lens is thereby controlled to be curved so that: a projection image of the light emitting chip, which is emitted from the emission surface of the lens, is not convexly curved in a forward direction from the cutoff line on a screen light distribution of the light distribution pattern; and a part of the projection image of the light emitting chip is substantially in contact with the cutoff line.

5. The vehicle headlamp according to claim 4, wherein:
the free curved face of the emission surface of the lens is constituted so that:
in a case where the first quadrant and the second quadrant are compared with each other in a symmetrical position relationship with respect to the vertical axis, a portion of about ⅓ or more of the first quadrant is higher than the second quadrant in a forward direction of the reference axis of the lens; and
in a case where the first quadrant and the fourth quadrant are compared with each other in a symmetrical position relationship with respect to the horizontal axis, a portion of about ⅓ or more of the first quadrant is lower than the fourth quadrant in a forward direction of the reference axis of the lens.

6. The vehicle headlamp according to claim 4, wherein:
the light source and the lens comprises:
a semiconductor-type light source and a lens for spot light distribution, which serve to implement a spot light distribution at a substantial central portion on a screen light distribution of the light distribution pattern; and
a semiconductor-type light source and a lens for diffused light distribution, which serve to implement a diffused light distribution of an entire portion on the screen light distribution of the light distribution pattern.

7. The vehicle headlamp according to claim 4, wherein:
the light source and the lens comprises:
a semiconductor-type light source and a lens for spot light distribution, which serve to implement a spot light distribution at a substantial central portion on a screen light distribution of the light distribution pattern; and
a semiconductor-type light source and a lens for diffused light distribution, which serve to implement a diffused light distribution of an entire portion on the screen light distribution of the light distribution pattern,
a long side of the light emitting chip of the semiconductor-type light source for spot light distribution is inclined with respect to the horizontal axis by rotating the long side by about 5 degrees so that the cruising lane side becomes upper than the opposite lane side with respect to the horizontal axis around the reference axis of the lens;
a long side of the light emitting chip of the semiconductor-type light source for diffused light distribution is parallel to the horizontal axis;
the lens for spot light distribution forms a spot light distribution by combining respective light distribution patterns, which are emitted from the first quadrant, the second quadrant, the third quadrant, and the fourth quadrant, with each other on the emission surface of the lens for diffused light distribution; and
the lens for diffused light distribution forms a diffused light distribution by combining respective light distribution patterns, which are emitted from the first quadrant, the second quadrant, the third quadrant, and the fourth quadrant, with each other on an emission surface of the lens for diffused light distribution, and forms a light distribution pattern for low beam, to be illuminated toward the forward direction of the vehicle by combining the spot light distribution formed by means of the lens for spot light distribution and the diffused light distribution formed by means of the lens for diffused light distribution with each other.

8. The vehicle headlamp according to claim 4, wherein:
the semiconductor-type light source and the lens comprise:
a light source and a lens for spot light distribution, which serve to implement a spot light distribution at a substantially central portion on a screen light distribution of the light distribution pattern; and
a light source and a lens for diffused light distribution, which serve to implement a diffused light distribution of an entire portion on the screen light distribution of the light distribution pattern,
the cutoff line of the light distribution pattern is made of:
an oblique cutoff line of an upward gradient from an elbow point to a cruising lane side;
an upper horizontal cutoff line from the oblique cutoff line to the cruising lane side; and
a lower horizontal cutoff line which is horizontal from the oblique cutoff line to an opposite lane side,
a long side of the light source for spot light distribution is inclined with respect to the horizontal axis by rotating the long side by about 5 degrees so that the cruising lane side is upper than the opposite lane side with respect to the horizontal axis around the reference axis of the lens;
a long side of the light source for diffused light distribution is parallel to the horizontal axis;
a projection image of the light emitting chip, which is emitted from the first quadrant and the fourth quadrant of an emission surface of the lenses for spot light distribution and for diffused light distribution, mainly forms a light distribution on the cruising lane side from the elbow point on the screen light distribution of the light distribution pattern; and
a projection image of the light emitting chip, which is emitted from the second quadrant and the third quadrant of an emission surface of the lenses for spot light distribution and for diffused light distribution, mainly forms a light distribution on the opposite lane side from the elbow point on the screen light distribution of the light distribution pattern.

9. A vehicle headlamp, comprising:
(i) a semiconductor-type light source having a light emitting chip shaped like a planar rectangle; and
(ii) a lens adapted to illuminate light from the light emitting chip of the semiconductor-type light source toward a forward direction of a vehicle, as a light distribution pattern having cutoff lines, wherein:
the semiconductor-type light source and the lens include:
a light source and a lens for spot light distribution, which serve to implement a spot light distribution at a substantially central portion on a screen light distribution of the light distribution pattern, a respective one of which has the light emitting chip; and
a light source and a lens for diffused light distribution, which serve to implement a diffused light distribution of an entire portion on the screen light distribution of the light distribution pattern, a respective one of which has the light emitting chip,
a center of a respective one of the light emitting chips is oriented in a forward direction of the reference axis of a respective one of the lenses;
a long side of the respective one of the light emitting chips is parallel to a horizontal axis orthogonal to the reference axis of the respective one of the lenses or is inclined with respect to the horizontal axis;

an incidence surface of the respective one of the lenses is made of a conical curved face;

an emission surface of a respective one of the lenses for spot light distribution and diffused light distribution is made of a free curved face controlled to be curved so that: a projection image of the respective one of the light emitting chips, which is emitted from the respective one of the lenses, is not convexly curved in an upward direction from the cutoff line on the screen light distribution of the light distribution pattern; and so that a part of the projection image of the respective one of the light emitting chips is substantially in contact with the cutoff line; and the free curved face of the emission surface of the lens includes a first quadrant, a second quadrant, a third quadrant, and a fourth quadrant which are divided by a vertical axis and a horizontal axis orthogonal to each other and passing through an origin, with a reference axis of lens serving as the origin in a front view, and is made of a free curved face on which: in a case where the first quadrant and the second quadrant are compared with each other in a symmetrical position relationship with respect to the vertical axis, a portion of about ⅓ or more of the first quadrant is higher than the second quadrant in a forward direction of the reference axis of the lens; and in a case where the first quadrant and the fourth quadrant are compared with each other in a symmetrical position relationship with respect to the horizontal axis, the portion of about ⅓ or more of the first quadrant is lower than the fourth quadrant in the forward direction of the reference axis of the lens.

10. The vehicle headlamp according to claim 9, wherein:

the cutoff line of the light distribution pattern is made of:
   an oblique cutoff line of an upward gradient from an elbow point to a cruising lane side;
   an upper horizontal cutoff line from the oblique cutoff line to the cruising lane side; and
   a lower horizontal cutoff line which is horizontal from the oblique cutoff line to an opposite lane side, a long side of the light source for spot light distribution is inclined with respect to the horizontal axis by rotating the long side by about 5 degrees so that the cruising lane side is upper than the opposite lane side with respect to the horizontal axis around the reference axis of the lens;

a long side of the light source for diffused light distribution is parallel to the horizontal axis;

a projection image of the light emitting chip, emitted from the first quadrant and the fourth quadrant of an emission surface of a respective one of the lens for spot light distribution and the lens for diffused light distribution, mainly forms a light distribution on the cruising lane side from the elbow point on the screen light distribution of the light distribution pattern; and a projection image of the light emitting chip, which is emitted from the second quadrant and the third quadrant of an emission surface of a respective one of the lens for spot light distribution and the lens for diffused light distribution, mainly forms a light distribution on the opposite lane side from the elbow point on the screen light distribution of the light distribution pattern.

* * * * *